United States Patent [19]

Kato

[11] Patent Number: 4,584,483
[45] Date of Patent: Apr. 22, 1986

[54] NOISE ERASING METHOD IN RADIATION IMAGE RECORDING AND REPRODUCING METHOD

[75] Inventor: Hisatoyo Kato, Kanagawa, Japan

[73] Assignee: Fuji Photo Film Co., Ltd., Kanagawa, Japan

[21] Appl. No.: 495,871

[22] Filed: May 18, 1983

[30] Foreign Application Priority Data

May 18, 1982 [JP] Japan .................................. 57-83797

[51] Int. Cl.$^4$ .............................................. G01T 1/00
[52] U.S. Cl. ................................ 250/459.1; 250/327.2
[58] Field of Search .................. 250/327.2, 484.1, 271, 250/459.1; 378/165; 364/569

[56] References Cited

U.S. PATENT DOCUMENTS

| | | | |
|---|---|---|---|
| 4,236,078 | 11/1980 | Kotera et al. | 250/363 R |
| 4,239,968 | 12/1980 | Kotera et al. | 250/327.2 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,394,581 | 7/1983 | Takahashi et al. | 250/484.1 |
| 4,438,333 | 3/1984 | Teraoka et al. | 250/327.2 |
| 4,439,682 | 3/1984 | Matsumoto et al. | 250/327.2 |

Primary Examiner—Alfred E. Smith
Assistant Examiner—Constantine Hannaher
Attorney, Agent, or Firm—Sughrue, Mion, Zinn, Macpeak and Seas

[57] ABSTRACT

After a radiation image stored in a stimulable phosphor sheet is read out, first erasing is conducted to erase radiation energy remaining in the stimulable phosphor sheet, and then second erasing is conducted to erase fog developing in the stimulable phosphor sheet immediately before the stimulable phosphor sheet is again used for recording a radiation image. The exposure amount in the second erasing is controlled according to the time interval between the first erasing and the second erasing.

5 Claims, 1 Drawing Figure

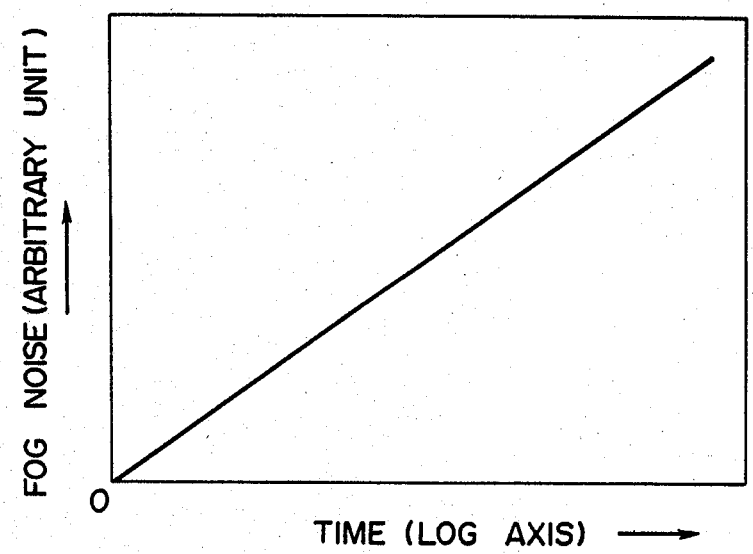

NOISE ERASING METHOD IN RADIATION IMAGE RECORDING AND REPRODUCING METHOD

BACKGROUND OF THE INVENTION

1. Field of the Invention

This invention relates to a method of effectively erasing noise from a stimulable phosphor sheet. This invention particularly relates to a method of effectively erasing noise due to repeated use of the stimulable phosphor sheet in a radiation image recording and reproducing method wherein the stimulable phosphor sheet is exposed to a radiation to record a radiation image therein and then exposed to stimulating rays to emit light in the pattern of the stored image, the emitted light is converted to an electric signal, and a visible image corresponding to the radiation image is reproduced by use of the electric signal.

2. Description of the Prior Art

When certain kinds of phosphors are exposed to a radiation such as X-rays, $\alpha$-rays, $\beta$-rays, $\gamma$-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. Nos. 4,258,264, 4,315,318 and 4,276,473, European Patent Publication No. 31952 and Japanese Unexamined Patent Publication No. 56(1981)-11395, it has been proposed to use the stimulable phosphor for recording a radiation image of an object for medical diagnosis or the like. Specifically, the stimulable phosphor is first exposed to a radiation to have a radiation image stored therein, and is then scanned with stimulating rays which cause it to emit light in the pattern of the stored image. The light emitted from the stimulable phosphor upon stimulation thereof is photoelectrically detected and converted to an electric image signal, which is processed in various ways as desired to reproduce a visible image of a quality suitable for viewing, particularly for diagnostic purposes.

In the radiation image recording and reproducing method as described above, the final visible image may be reproduced in the form of a hard copy or may be displayed on a cathode ray tube. The stimulable phosphor sheet used in this method may be in any of various forms such as a panel, drum or the like, which are herein generally referred to as sheets. For economical reasons, it is desirable that the stimulable phosphor sheet be used repeatedly.

In order to reuse the stimulable phosphor sheet, it is necessary that the stimulable phosphor sheet to be reused be made completely free from the previously stored radiation image. Theoretically, the radiation energy of the radiation image stored in the stimulable phosphor sheet should disappear when the sheet is scanned with stimulating rays of a sufficient intensity to cause light to emit therefrom in proportion to the stored radiation energy in the course of the radiation image read-out process. Actually, however, the stored radiation energy cannot be completely eliminated only with the stimulating rays used to scan the stimulable phosphor sheet during the aforesaid process. Thus a part of the previously stored radiation image remains in the reused stimulable phosphor sheet and inconveniently causes noise to occur in the visible image reproduced from the reused stimulable phosphor sheet. In order to successfully reuse the stimulable phosphor sheet, any such residual radiation image therein must be erased completely before reuse.

Further, a stimulable phosphor contains a trace of radioactive isotopes such as $^{226}$Ra and $^{40}$K, which emit radiations and cause the stimulable phosphor sheet to store the emitted radiation energy even when the sheet is not being used for recording radiation images. These traces of radioactive isotopes also constitute a cause of noise developing in the reproduced visible radiation image. Furthermore, a stimulable phosphor sheet is also affected by environmental radiations such as cosmic rays and X-rays emitted from other X-ray sources and stores the energy thereof. These types of radiation energy undesirably stored in the stimulable phosphor sheet (hereinafter referred to as fog) also cause noise to appear in the visible radiation image reproduced from a reused stimulable phosphor sheet and, therefore, must be erased before reusing the stimulable phosphor sheet.

In order to avoid a noise due to the radiation image previously stored in a stimulable phosphor sheet and a noise due to fog developing during the storage of the sheet, the Applicant has proposed in his Japanese Unexamined Patent Publication No. 56(1981)-11392 (European Patent Publication No. 22564) to stimulate the stimulable phosphor sheet by use of light of wavelengths including the wavelength range of the stimulating rays for the phosphor before storing a radiation image in the stimulable phosphor sheet, thereby to discharge the detrimental radiation energy therefrom to an acceptable extent.

In this method, however, erasing of the residual radiation image and fog in the stimulable phosphor sheet must be carried out immediately before the stimulable phosphor sheet is used for recording a radiation image. This is necessary to minimize fog developing in the stimulable phosphor sheet after the erasing is carried out.

The inventors conducted experiments to find what levels of radiation energy of the residual image and fog in the reused phosphor caused noise to develop in the reproduced visible radiation image to an extent adversely affecting diagnosis. From the results of these experiments, it has been found that, in order to eliminate the detrimental noise due to the residual image, the radiation energy of the radiation image stored in the phosphor must be erased to the order of $10^{-4}$ to $10^{-6}$. Stated differently, the original radiation energy stored in the phosphor must be erased to a level between 0.01 and 0.0001 when the maximum of the original level is 100. On the other hand, the level of fog developing in the phosphor is generally about 0.1 to 0.001 based on the maximum of the stored original radiation energy which is taken as 100 as described above. It has also been found that the fog must be erased to a level between about 0.01 and 0.0001 in order to eliminate the developed detrimental noise in the next radiation image recording operation.

However, in order to erase the radiation energy of the previously stored radiation image to the order of $10^{-4}$ to $10^{-6}$, the phosphor must be exposed to a high illuminance for a long period of time, for example to 30,000 lx for 100 to 1,000 seconds by using a tungsten-filament lamp. This necessitates a large-scale erasing apparatus and, in addition, erasing must be started a considerable length of time before a radiation image is to be recorded in the stimulable phosphor sheet. In practical use, it is very troublesome to carry out such an erasing operation each time a radiation image is to be recorded on the stimulable phosphor sheet. Further, it is very inconvenient in practical use to install a large-scale erasing apparatus in the vicinity of the image recording apparatus.

The inventors conducted various experiments with respect to the aforesaid two kinds of causes of noise, and have found that the erasability thereof differs considerably between the residual radiation image having a level of radiation energy of about 0.1, which remains in a stimulable phosphor after the radiation energy of the previously stored image is erased from the level of 100 to about 0.1, and the fog accumulated in the stimulable phosphor to a level of about 0.1 when the phosphor is allowed to stand, even though the level of radiation energy is the same That is to say, after the previously stored image is erased from the level of 100 to about 0.1, the resulting residual image suddenly becomes difficult to erase. For example, the previously stored image can be erased to a level of about 0.1 when exposed to light at an illuminance of 10,000 lx for about 10 seconds, but it takes about 100 seconds for the resulting residual image to be further erased to a level of 0.01. In contrast, fog of the level of about 0.1 can be erased in less than one second at an illuminance of 10,000 lx.

Based on the above-mentioned findings, the inventors have proposed in European Patent Publication No. 56599 a noise erasing method comprising two erasing steps wherein the first erasing which requires a long period of time to erase the previously stored image is carried out at an appropriate point of time after the radiation image is stored in a stimulable phosphor and scanned with stimulating rays, and the second erasing for the fog which can be erased quickly is conducted immediately before the next radiation image recording operation.

According to this proposed method, the first erasing in which the radiation image previously stored in the stimulable phosphor is to be erased at a high illuminance for a long period of time by use of a large-scale apparatus can be carried out at an appropriate point of time after the stimulable phosphor sheet has been used for recording a radiation image. After the first erasing is finished, the stimulable phosphor sheet can be transferred to the vicinity of the site where it is to be used for the next radiation image recording operation. Thereafter, immediately before the next radiation image recording operation is to be started, the second erasing can be conducted for a short length of time to erase the fog, if any, by use of a simple small-scale apparatus. Thus this method can effectively eliminate the causes of noise and provide a noise-free reproduced visible radiation image.

Further experiments conducted on the fog developing due to radiations emitted from radioactive isotopes contained in the stimulable phosphor sheet and due to environmental radiations revealed that noise due to the fog increases with time. Accordingly, when the second erasing is conducted within short time intervals after the first erasing, noise due to the fog can be erased by use of a small exposure amount. However, when long time has elasped after the first erasing, noise due to the fog must be erased by use of a large exposure amount. Stated differently, if the exposure amount is maintained constant regardless of the level of noise, it follows that exposure to light is effected to an unnecessarily high extent and energy is wasted when the level of noise is low, and that noise is not erased sufficiently when the level of noise is high. The term "exposure amount" as used herein means the illuminance of the erasing light multiplied by the time the stimulable phosphor is exposed to the erasing light.

SUMMARY OF THE INVENTION

The primary object of the present invention is to provide a method of erasing noise developing in a stimulable phosphor sheet due to repeated use of the stimulable phosphor sheet in a radiation image recording and reproducing method, wherein second erasing is conducted effectively and economically.

Another object of the present invention is to provide a method of erasing noise developing in a stimulable phosphor sheet due to repeated use of the stimulable phosphor sheet in a radiation image recording and reproducing method, wherein the exposure amount in second erasing is controlled according to the level of noise due to fog.

The specific object of the present invention is to provide a method of erasing noise developing in a stimulable phosphor sheet due to repeated use of the stimulable phosphor sheet in a radiation image recording and reproducing method, which always provides a noise-free sharp radiation image.

The present invention provides a noise erasing method in which first erasing is conducted by exposing a stimulable phosphor sheet capable of being repeatedly used for radiation image recording and reproducing to light, thereby erasing radiation energy stored in said stimulable phosphor sheet due to a radiation image once stored therein, and then second erasing is conducted by exposing said stimulable phosphor sheet to light immediately before the next radiation image recording is carried out, thereby erasing fog developing in said stimulable phosphor sheet after said first erasing, wherein the improvement comprises controlling the exposure amount in said second erasing according to the time interval between said first erasing and said second erasing. Since the second erasing is carried out by use of a necessary and sufficient exposure amount even when the level of noise due to fog changes as the time interval between the first erasing and the second erasing changes, the method in accordance with the present invention is advantageous from the economical viewpoint and can always provide a noise-free sharp radiation image.

The present invention will hereinbelow be described in further detail with reference to the accompanying drawing.

BRIEF DESCRIPTION OF THE DRAWING

The single FIGURE is a graph showing the change in the level of noise due to fog developing in a stimulable phosphor sheet with time.

DETAILED DESCRIPTION OF THE INVENTION

The exposure amount necessary for erasing the previous stored radiation image in the first erasing varies according to the sensitivity of the stimulable phosphor sheet employed. In general, however, the exposure amount in the first erasing is at least 500,000 lx·sec., preferably within the range of 3,000,000 to 9,000,000 lx·sec. When the stimulable phosphor sheet is allowed to stand after the first erasing is finished, fog develops therein due to the radiations emitted from radioactive isotopes and due to environmental radiations. The level of noise due to the fog increases with time.

The drawing is a graph showing the change in the level of noise due to the fog developing in the stimulable phosphor sheet with time. As is clear from the drawing, the level of noise increases approximately in proportion to the logarithm of the time elapsing after the first erasing. The level of noise due to the fog varies according to the amount of radioactive isotopes contained in the stimulable phosphor sheet. Since the amount of radioactive isotopes is very small, it is difficult to measure the amount thereof. However, as for a group of specific stimulable phosphor sheets, the increase in the level of noise due to the fog with time can be experimentally measured. Therefore, as for the group of specific stimulable phosphor sheets, the exposure amount necessary for the second erasing can be determined as a function of time.

As a stimulable phosphor, for example, rare earth element activated alkaline earth metal fluorohalide phosphor is preferred. One example of this phosphor is, as shown in DE-OS No. 2,928,245, a phosphor represented by the formula $(Ba_{1-x-y},Mg_x,Ca_y)FX:aEu^{2+}$ wherein X is at least one of Cl and Br, x and y are numbers satisfying $0<x+y\leq0.6$ and $xy\neq0$, and a is a number satisfying $10^{-6}\leq a\leq5\times10^{-2}$. Another example of this phosphor is, as shown in U.S. Pat. No. 4,239,968, a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0\leq x\leq0.6$, and y is a number satisfying $0\leq y\leq0.2$. Further, as the stimulable phosphor to be used in this invention can be used ZnS:Cu,Pb; $BaQ\cdot xAl_2O_3$: Eu wherein $0.8\leq x\leq10$; and $M^{II}O\cdot xSiO_2$:A wherein $M^{II}$ is Mg, Ca, Sr, Zn, Cd or Ba, A is Ce, Tb, Eu, Tm, Pb, Tl, Bi or Mn, and x is number satisfying $0.5\leq x\leq2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0<x<0.1$, as shown in U.S. Pat. No. 4,236,078. Among the above enumerated phosphors, the rare earth element activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined Patent Publication Nos. 56(1981)-2385 and 56(1981)-2386, or barium fluorohalide phosphors added with at least one of a metal chloride, a metal bromide and a metal iodide as disclosed in European Patent Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in U.S. patent appln. Ser. No. 156,520, U.S. Pat. No. 4,394,581 (European Patent Publication No. 21,174).

As the light source in the second erasing, it is possible to employ a tungsten-filament, fluorescent, sodium, xenon luminescent or xenon flash lamp or the like.

The time interval between the first erasing and the second erasing may be measured in various manners. For example, a bar code label on which an ID number is recorded may be attached to the stimulable phosphor sheet. In this case, the ID number recorded on the bar code label is read out at the time of first erasing, and stored in a memory of a system controller together with the point of time when the first erasing is conducted. At the time of the second erasing, the ID number recorded on the bar code label is again read out, and the time interval between the first erasing and the second erasing is measured by the system controller. Alternatively, a recording medium such as magnetic recording medium, semiconductor recording medium, or optical recording medium may be attached to the stimulable phosphor sheet. In this case, the point of time when the first erasing is conducted is recorded in the recording medium at the time of the first erasing. When the second erasing is carried out, the point of time of the first erasing recorded in the recording medium is read out, and the time interval between the first erasing and the second erasing is determined.

As described above, in the first erasing, the stimulable phosphor sheet must be exposed to a high illumination for a long period. In general, therefore, the first erasing is carried out by use of a large-scale erasing apparatus for the first erasing at a location such as a central processing station different from the radiation image recording station. After the radiation image previously stored in the stimulable phosphor sheet is erased by the first erasing, the stimulable phosphor sheet is transferred to the radiation image recording station, where the second erasing is carried out immediately before the next radiation image is to be recorded on the stimulable phosphor sheet. Thus, in many cases, the first erasing and the second erasing are carried out at different locations. Accordingly, measurement of the time interval between the first erasing and the second erasing should preferably be performed by recording the point of time of the first erasing on a recording medium attached to the stimulable phosphor sheet.

It is advantageous that the stimulable phosphor sheet from which the previously stored radiation image has been erased by the first erasing be exposed to light to completely eliminate noise due to the fog immediately before the stimulable phosphor sheet is to be used for the next recording operation, for example, when the stimulable phosphor sheet is loaded into a cassette or carried from a sheet reservoir containing a plurality of such stimulable phosphor sheets to the radiation image recording section. For example, the second erasing can be effected simply by use of a light source located at a part of a loader for loading the stimulable phosphor sheet from the sheet reservoir to the cassette. When the recording apparatus is provided with an automatic sheet feeding means, the second erasing can be effected simply by use of a light source located in the vicinity of the sheet feeding path leading to the recording section. This is advantageous in practical use.

The second erasing should preferably be carried out immediately before the next radiation image recording operation in order to minimize noise due to the fog. By "immediately before" is meant such a point of time that noise can be eliminated practically sufficiently before the stimulable phosphor sheet is used for the next recording operation. Usually, the second erasing should desirably be conducted within eight hours, preferably within six hours, before the next recording operation.

I claim:

1. A noise erasing method in which first erasing is conducted by exposing a stimulable phosphor sheet capable of being repeatedly used for radiation image recording and reproducing to light, thereby erasing radiation energy stored in said stimulable phosphor sheet due to a radiation image once stored therein, and then second erasing is conducted by exposing said stimulable phosphor sheet to light immediately before the next radiation image recording is carried out, thereby erasing fog developing in said stimulable phosphor sheet after said first erasing, wherein the improvement comprises controlling the exposure amount in said second erasing according to the time interval between said first erasing and said second erasing.

2. A noise erasing method as defined in claim 1 wherein said time interval between said first erasing and said second erasing is measured by attaching a bar code label carrying an ID number recorded thereon to said stimulable phosphor sheet, reading out said ID number at the time of said first erasing, storing the read-out ID number signal in a memory together with the point of time when the first erasing is conducted, again reading out said ID number at the time of said second erasing, and calculating said time interval between said first erasing and said second erasing.

3. A noise erasing method as defined in claim 1 wherein said time interval between said first erasing and said second erasing is measured by attaching a recording medium to said stimulable phosphor sheet, recording the point of time when said first erasing is conducted in said recording medium at the time of said first erasing, reading out said point of time of said first erasing at the time of second erasing, and calculating said time interval between said first erasing and said second erasing.

4. A noise erasing method as defined in claim 3 wherein said recording medium is selected from the group consisting of a magnetic recording medium, a semiconductor recording medium and an optical recording medium.

5. A noise erasing method as defined in claim 1 wherein said exposure amount in said second erasing is obtained by use of a light source selected from the group consisting of a tungsten-filament lamp, a fluorescent lamp, a sodium lamp, a xenon luminescent lamp and a xenon flash lamp.

* * * * *